(12) United States Patent
Rao et al.

(10) Patent No.: US 7,808,205 B2
(45) Date of Patent: Oct. 5, 2010

(54) BATTERY CHARGER AND METHOD FOR COMMUNICATING BATTERY PACK CHARGING STATUS INFORMATION

(75) Inventors: Jaya B. Rao, Perlis (MY); Macwien Krishnamurthi Annamalai, Petaling Jaya (MY); Mohd Hisham Muddin Che At, Penang (MY); Poh Huat Low, Penang (MY)

(73) Assignee: Motorola, Inc, Schaumburg, IL (US)

( * ) Notice: Subject to any disclaimer, the term of this patent is extended or adjusted under 35 U.S.C. 154(b) by 703 days.

(21) Appl. No.: 11/754,632

(22) Filed: May 29, 2007

(65) Prior Publication Data

US 2008/0297104 A1    Dec. 4, 2008

(51) Int. Cl.
*H02J 7/00* (2006.01)
*H01M 2/10* (2006.01)

(52) U.S. Cl. .................. 320/106; 320/110; 320/125; 429/99

(58) Field of Classification Search .................. 320/106
See application file for complete search history.

(56) References Cited

U.S. PATENT DOCUMENTS

| | | | |
|---|---|---|---|
| 5,350,993 A | | 9/1994 | Toya et al. |
| 5,455,499 A | * | 10/1995 | Uskali et al. ............. 340/636.1 |
| 5,654,623 A | | 8/1997 | Shiga et al. |
| 5,680,027 A | * | 10/1997 | Hiratsuka et al. ........... 320/106 |
| 6,031,353 A | * | 2/2000 | Banyas et al. ................ 320/112 |
| 6,211,644 B1 | | 4/2001 | Wendelrup et al. |
| 6,429,622 B1 | * | 8/2002 | Svensson ..................... 320/106 |
| 6,522,361 B2 | * | 2/2003 | Higuchi et al. .............. 348/372 |
| 6,522,902 B2 | * | 2/2003 | Nishihara et al. ........... 455/574 |

OTHER PUBLICATIONS

Watson Swager, Anne: "Smart-Battery Technology: Power Management's Missing Link", EDN Electrical Design News, No. 5, EDN Access, SP000517981 Newton, MA, US ISSN: 0012-7515, http://www.edn.com/archives/1995/030295/05df1.htm, pp. 47-64.
Chase J. et al.: "Intelligence for Batteries From Now to 2000. In-pack Charge Control Leads the Way", Conference Proceedings Article, XP010153837, Battery Conference on Applications and Advances, 1996, Eleventh Annual Long Beach, CA, USA ISBN : 0-7803-2994-5/96, IEEE, pp. 213-216.
Comissioner: "PCT International Search Report and Written Opinion", WIPO, ISA/KR, Oct. 29, 2008.

* cited by examiner

*Primary Examiner*—Edward Tso
*Assistant Examiner*—Yalkew Fantu
(74) *Attorney, Agent, or Firm*—Anthony P. Curtis

(57) ABSTRACT

A battery charger and method for communicating battery pack charging status information of a battery pack coupled to both the battery charger and an electronic device such as a radio is presented. An authenticity battery pack identifier and battery status information provided by the battery pack to the battery charger is read. The authenticity battery pack identifier and charging status information is transmitted over a wireless link from the battery charger to the radio. The charging status information is then processed by the radio when the authenticity battery pack identifier matches a currently coupled battery pack identifier stored on the radio. The currently coupled battery pack identifier identifies the battery pack that is coupled to the radio.

19 Claims, 5 Drawing Sheets

BATTERY CHARGER AND METHOD FOR COMMUNICATING BATTERY PACK CHARGING STATUS INFORMATION

FIELD OF THE INVENTION

The present invention relates generally to battery charging and more particularly to battery chargers and methods for communicating battery pack charging status information.

BACKGROUND

Portable communications products, such as radios, are usually powered by rechargeable battery packs. Such battery packs can be charged by a battery charger based on a variety of parameters such as voltage, battery chemistry, rated capacity, and temperature. While positive and negative charging power line contacts (Batt+ and Batt−) are used for charging and measuring the battery pack voltage, many battery packs also include additional contacts for communicating parameters, such as temperature and charging rate, to the battery charger. Furthermore, battery packs usually includes positive and negative battery power line contacts as well as a parameter status output contact to interface the battery pack to the radio.

Manufacturers of battery chargers have realized that the chargers can be made less sophisticated and less expensive if the battery pack provides some indication of how it should be recharged. One way for transferring battery pack information to the charger with fewer contacts is to produce a battery pack with a memory device. The memory device contains charge instructions and other recharge related data, such as rated capacity and chemistry. When the battery pack is coupled to the charger, the charger retrieves the information from the battery pack's memory and charges the battery pack accordingly. However, if the radio is coupled to the battery pack during charging, the limited number of contacts does not readily allow the current charging status of the battery pack to be provided to the radio for processing and displaying on a display of the radio.

BRIEF DESCRIPTION OF THE FIGURES

In order that the invention may be readily understood and put into practical effect, reference will now be made to an exemplary embodiments as illustrated with reference to the accompanying figures, where like reference numerals refer to identical or functionally similar elements throughout the separate views. The figures together with a detailed description below, are incorporated in and form part of the specification, and serve to further illustrate the embodiments and explain various principles and advantages, in accordance with the present invention where.

Figure 1:
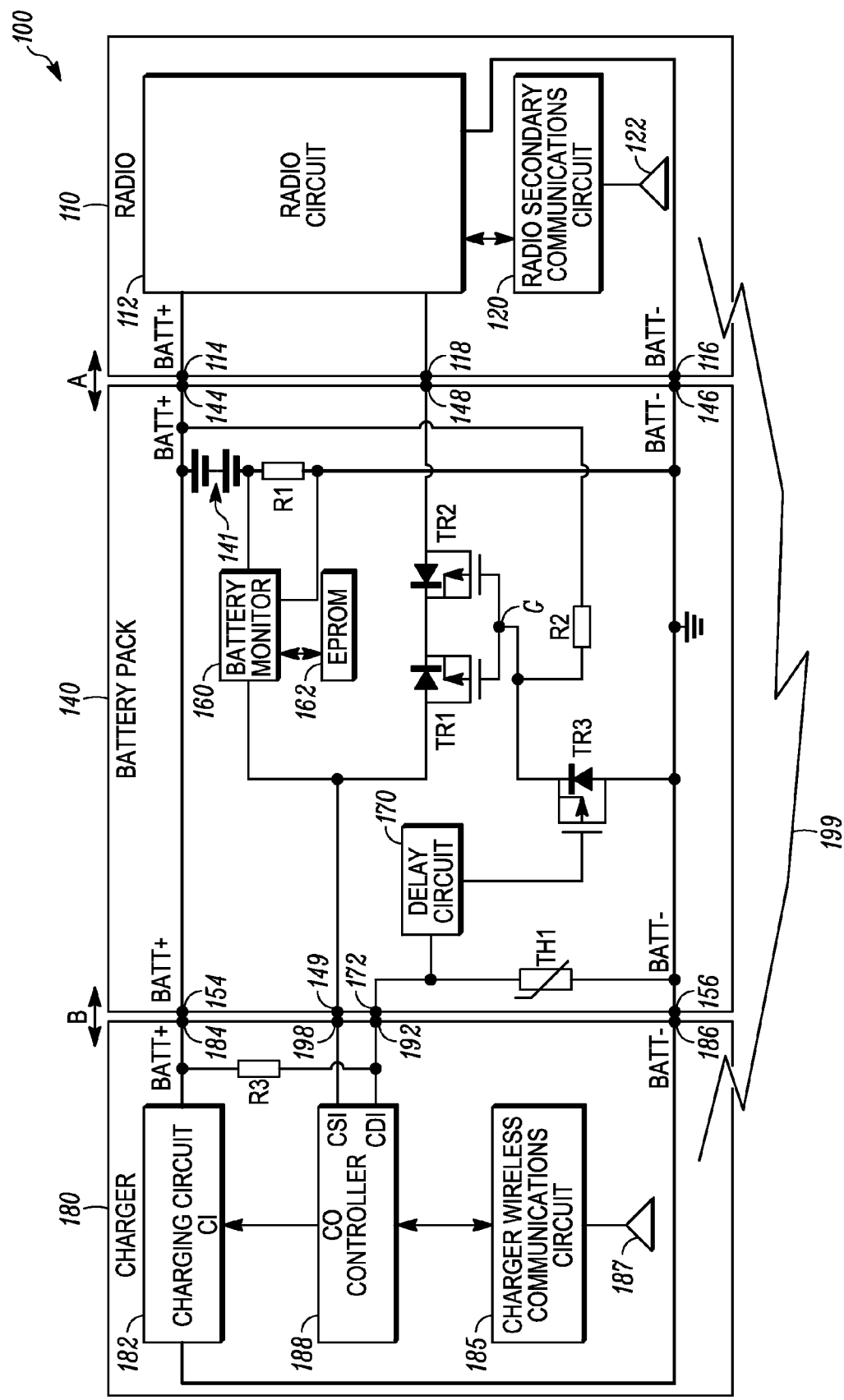
FIG. 1 is a schematic diagram illustrating a system in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of battery charger components and method steps. The battery charger components and method steps have been represented by showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a battery charger components and method steps that comprises a list of elements does not include only those elements but may include other elements not expressly listed or inherent to such a battery charger components or method steps. An element proceeded by "comprises . . . a" does not, without more constraints, preclude the existence of additional identical elements in the method or device that comprises the element.

According to one aspect of the present invention there is provided a method for communicating battery pack charging status information of a battery pack from a battery charger to an electronic device when the battery charger and the electronic device are both coupled to the battery pack, the method comprising: reading an authenticity battery pack identifier and battery status information provided by the battery pack to the battery charger; transmitting in a status message over a wireless link the authenticity battery pack identifier and charging status information from the battery charger to the electronic device; and processing, by the electronic device, the charging status information when the authenticity battery pack identifier matches a currently coupled battery pack identifier stored on the electronic device, the currently coupled battery pack identifier identifying the battery pack that is coupled to the electronic device.

According to another aspect of the present invention there is provided a method for communicating battery pack charging status information of a battery pack from a battery charger to an electronic device when the battery charger and the electronic device are both coupled to the battery pack, the method comprising: reading an authenticity battery pack identifier and battery status information provided by the battery pack to the battery charger; and transmitting in a status message over a wireless link the authenticity battery pack identifier and charging status information from the battery charger to the electronic device.

According to another aspect of the present invention there is provided a method for communicating battery pack charging status information of a battery pack from a battery charger to an electronic device when the battery charger and the electronic device are both coupled to the battery pack, the method comprising: reading an authenticity battery pack identifier and battery status information provided by the battery pack to the battery charger; receiving in a status message transmitted over a wireless link an authenticity battery pack identifier and charging status information provided by the battery pack to the battery charger; and processing, by the electronic device, the charging status information when the authenticity battery pack identifier matches a currently coupled battery pack identifier stored on the electronic device, the currently coupled battery pack identifier identifying the battery pack that is coupled to the electronic device.

According to another aspect of the present invention there is provided a battery charger comprising: a controller having a charge status input; a wireless communications circuit coupled to the controller; and a battery charging circuit having at least one control input coupled to the controller, wherein when the battery charger is coupled to the battery pack the controller reads an authenticity battery pack identifier provided by the battery pack at the charge status input and the wireless communications circuit transmits the battery pack identifier over a wireless link.

Referring to FIG. 1, there is a schematic diagram illustrating a system 100 comprising an electronic device in the form of a radio 110 coupled to a battery pack 140 and a battery charger 180 that is also coupled to the battery pack 140. As will be apparent to a person skilled in the art, the battery pack 140 is releasably coupled to the radio 110 as indicated by arrowed line A. Similarly, the battery pack 140 is releasably coupled to the charger 180 as indicated by arrowed line B. The radio 110 typically has a conventional radio circuit 112 with Batt+ and Batt− power lines coupled by respective battery power line contacts 114, 116 to battery power line contacts 144, 146 of the battery pack 140. The radio 110 also has a battery parameter status input contact 118 coupled to a battery parameter status output contact 148 of the battery pack 140, the battery parameter status input contact 118 being coupled to the radio circuit 112. There is also a radio secondary communications circuit 120 with an antenna 122, the radio secondary communications circuit 120 being coupled to the radio circuit 112.

The battery pack 140 has a plurality of battery cells 141 with a positive electrode providing the power for the Batt+ power line that is coupled to both the battery power line contact 144 and a charging power line contact 154. Similarly, a negative electrode of the battery cells 141 provides the power for the Batt− power line that is coupled, through a resistor R1 to both the battery power line contact 146 and a charging power line contact 156. The battery pack 140 also has a battery monitor circuit 160 coupled to a non-volatile memory unit (memory device) in the form of an Erasable Programmable Read Only Memory (EPROM) 162. An output of the battery monitor circuit 160 is coupled directly to a battery parameter status output contact 149 and it is coupled to the battery parameter status output contact 148 through two series coupled Field Effect Transistors TR1 and TR2.

The two Field Effect Transistors TR1 and TR2 have their gate electrodes coupled to a common node G that is coupled through a pull up resistor R2 to the Batt+ power line. Thus, when the battery pack 140 is un-coupled from the charger 180 there is a forward bias at the common node G resulting in both the Field Effect Transistors T1, T2 conducting and allowing communication between the battery monitor circuit 160 and radio circuit 112 through the battery parameter status output contact 148 and the battery parameter status input contact 118.

The common node G is also coupled to a drain electrode of a Field Effect Transistor TR3 and a source electrode of the Field Effect Transistor TR3 is coupled to the Batt− power line. A gate electrode of the Field Effect Transistor TR3 is coupled through a delay circuit 170 to both a charger coupling detector input contact 172 and a thermistor TH1. The delay circuit 170 is typically a Resistor Capacitor network and the thermistor TH1 couples the Batt− power line to the charger coupling detector input contact 172. As will be apparent to a person skilled in the art, the thermistor TH1 functions as a temperature sensor in order to reduce the possibility of the battery pack 140 from overheating during charging.

The battery monitor circuit 160 is typically an Integrated Circuit such as a DS2438 Chip supplied by the Dallas Semiconductor Corporation and inputs of the battery monitor circuit 160 are connected across the resistor R1. Thus, the battery monitor circuit 160 can monitor a Voltage across the resistor R1 (in which resistor R1 is typically of a low resistance of about 0.05 ohms) to therefore determine current flow associated with the battery cells 141. The EPROM 162 stores a battery pack identifier that uniquely identifies the battery pack 140 and also stores charge instructions and other recharge related data, such as rated capacity and chemistry.

A pull up resistor R3 couples the battery coupling detector input contact 192 to the Batt+power line. As illustrated, when the charger 180, is coupled to the battery pack 140 and the battery pack 140 is coupled to the radio 110, a wireless link 199 (radio link) is formed between the charger wireless communications circuit 185 and the radio secondary communications circuit 120.

A pull up resistor R3 couples the battery coupling detector input contact 192 to the Batt+ power line. As illustrated, when the charger 180, is coupled to the battery pack 140 and the battery pack 140 is coupled to the radio 110, a wireless link 199 (radio link) is formed between the charger wireless communications circuit 185 and the radio secondary communications circuit 120.

In a first embodiment the charger wireless communications circuit 185 can comprise a short range transmitter and the radio secondary communications circuit 120 can be a receiver. Thus only one way communication is possible in which the charger wireless communications circuit 185 only transmits messages across the wireless link 199 and the radio secondary communications circuit 120 only receives messages across the wireless link 199.

In second embodiment both the charger wireless communications circuit 185 and the radio secondary communications circuit 120 can comprise a short range transceiver and thus two way communication across the wireless link 199 is provided between the charger wireless communications circuit 185 and the radio secondary communications circuit 120. Suitably, in the second embodiment the charger wireless communications circuit 185 and the radio secondary communications circuit 120 form a Radio Frequency Identification (RFID) system in which the charger wireless communications circuit 185 is a primary transceiver and the radio secondary communications circuit 120 is a radio transponder (RF tag).

Figure 2:
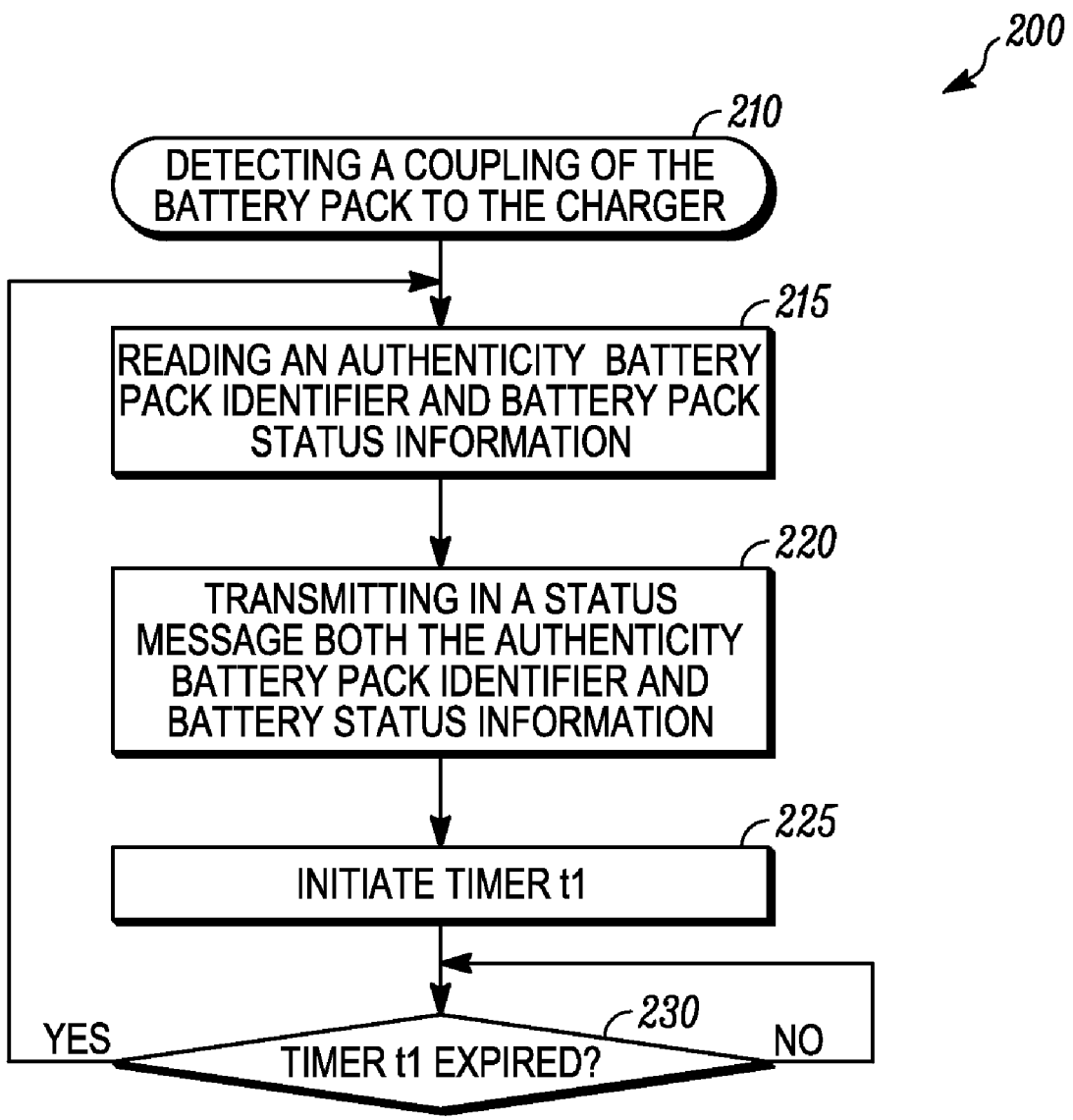
FIG. 2 is a flow diagram illustrating a first embodiment of a method for communicating battery pack charging status information from a charger to a radio that forms part of the system of FIG. 1.

Referring to FIG. 2 there is a flow diagram illustrating a first embodiment of a method 200 for communicating battery pack charging status information from the charger 180 to the radio 110 using one way communication across the wireless link 199 when the charger 180 and the radio 110 are both coupled to the battery pack 140. The method 200 is performed by the charger 180 and invoked at a detecting block 210 by detecting a coupling of the battery pack 140 to the charger 180. The detecting is achieved by the pull up resistor R3 pulling up the coupling detection input CDI to Batt+ when the battery pack 140 is coupled to the charger 180. Also, when the battery pack 140 is coupled to the charger 180, there is a short delay (due to the delay circuit 170) before the pull up resistor R3 biases the Field Effect Transistor TR3 to conduct. As a result, after the short delay, the common node G is pulled low to Batt− such that the Field Effect Transistor T2 is non conducting thereby disallowing communication between the battery monitor circuit 160 and radio circuit 112 through the parameter status output contact 148 and the battery parameter status input contact 118.

At a reading block 215, the charger 180 reads an authenticity battery pack identifier, battery type information (that may comprise part of the authenticity battery pack identifier) and battery pack status information provided by the battery monitor circuit 160 and EPROM 162 circuitry to the controller 188 at the charge status input CSI. Also, if the battery type information identifies that the battery pack 140 is of a type that can be charged by the charger 180 (valid battery pack) and the battery pack status information indicates that the battery cells 141 are not fully charged then the controller 188 controls the charging circuit 182 to supply a suitable voltage and charging current to the battery cells 141.

At a transmitting block 220 the charger 180 transmits, in a status message, both the authenticity battery pack identifier and charging status information from the charger 180 to the radio 110 over the wireless link 199. If required, this status message may be encrypted by any know encryption technique. At a block 225, a TIMER t1 is then initiated and at test block 230 a test is repeated until the TIMER t1 expires, the method 200 then returns to the reading block 215. As will be apparent to a person skilled in the art, the method 200 can terminate at any time if the charger 180 is un-coupled from the battery pack 140 or if the power to the charger 180 is switched off. In addition, the battery monitor circuit 160 updates the charging status information by monitoring the current flowing through resistor R1 and this updated charging status information is read by the charger 180 every time the reading block 215 is performed.

Figure 3:
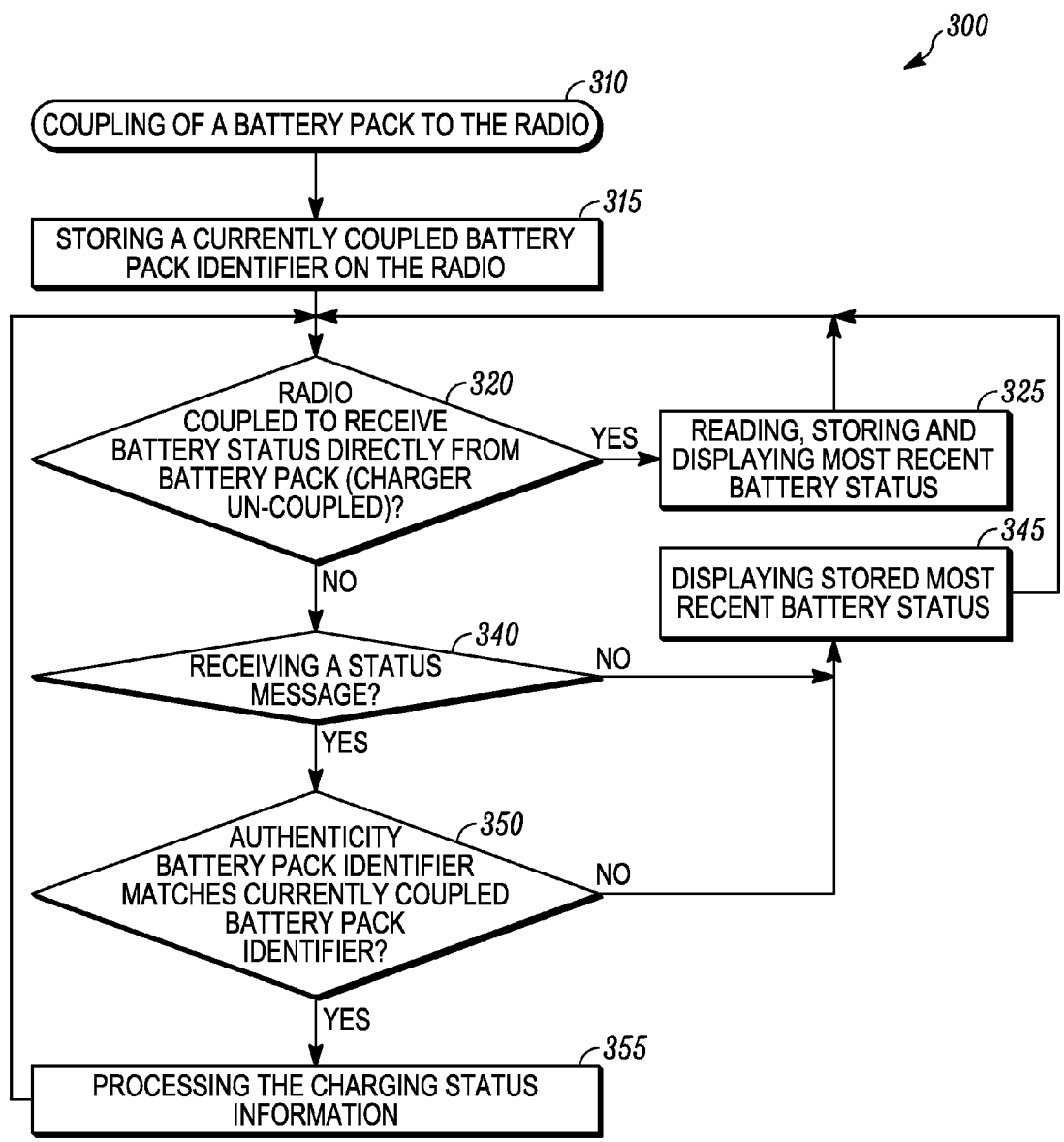
FIG. 3 is a flow diagram further illustrating the first embodiment of the method for communicating battery pack charging status information from the charger to the radio that forms part of the system of FIG. 1.

Referring to FIG. 3 there is a flow diagram further illustrating the first embodiment of a method 300 for communicating battery pack charging status information from the charger 180 to the radio 110 using one way communication across the wireless link 199. The method 300 is performed by the radio 110 and is invoked at a coupling block 310 when the battery pack 140 is coupled to the radio 110 thereby providing power to the radio 110. Next, at a storing block 315 the radio 110 stores a currently coupled battery pack identifier in the radio 110 (in a memory of the radio circuit 112), the currently coupled battery pack identifier being provided by the battery pack 140 to the radio 110 before the charger 180 is coupled to the battery pack 140. Hence, the currently coupled battery pack identifier is stored on the radio 110 when the radio 110 initially detects a coupling of the battery pack 140 to the radio 110 before the charger 180 is coupled to the battery pack 140. More specifically, when the charger 180 is un-coupled from the battery pack 140 the Field Effect Transistors T1, T2 allow communication between the battery monitor circuit 160 and radio circuit 112 through the parameter status output contact 148 and the battery parameter status input contact 118. This allows for the currently coupled battery pack identifier to be stored and the battery status information (such as remaining battery cell charge) provided by the battery monitor circuit 160 to be processed and displayed by an electronic display of the radio circuit 112.

At a test block 320, a test is performed to determine if the radio 110 is coupled to receive battery status information directly from the battery pack 140. At this test block 320, the radio 110 attempts to communicate with the battery monitor circuit 160. The radio 110, however, can only communicate if the charger 180 is un-coupled from the battery pack 140. If the charger 180 is un-coupled from the battery pack 140 while the radio 110 and battery pack 140 remain connected, the radio 110 can communicate directly with the EPROM 162 and battery monitor circuit 160 through the battery parameter status input contacts 118, 148. Thus, at a block 325 the radio 110 reads, stores, and displays the most recent battery status information on the electronic display of the radio circuit 112. After block 325 the test block 320 is repeated.

If the charger 180 is coupled to the battery pack 140 the radio 110 cannot communicate directly with the EPROM 162 and battery monitor circuit 160. Thus, after test block 320 it is determined at test block 340 if the status message has been received (typically by an interrupt process) by the radio secondary communications circuit 120 across the wireless link 199. If the status message has not been received, then at a block 345, the most recent battery status information, which is stored, is displayed on the electronic display of the radio circuit 112, the most recent battery status information being previously stored during performance of block 325. After block 345, the test block 320 is repeated.

If at test block 340 it is determined that a status message has been received then a matching test is performed at a test block 350 to determine if the authenticity battery pack identifier in the status message that has been received matches the currently coupled battery pack identifier. As will be apparent to a person skilled in the art, if the status message is encrypted then radio circuit 122 performs decryption of the status message before the matching test. If there is no match at test block 350 then block 345 displays the stored most recent battery status information on the electronic display of the radio circuit 112. However, if there is a match at test block 350, the radio 110 processes the charging status information at a processing block 355. Hence, processing of the charging status information by the radio 100 occurs when the authenticity battery pack identifier matches the currently coupled battery pack identifier. The processing includes displaying the charging status information (the battery status) on the information on the electronic display of the radio circuit 112. The method 300 then returns to test block 320. This charging status information (the battery status) is then stored as the most recent battery status in memory of the radio circuit 112. As will be apparent to a person skilled in the art, the method 300 can terminate at any time if the radio 110 is un-coupled from the battery pack 140 or if the radio 110 switched off.

Figure 4:
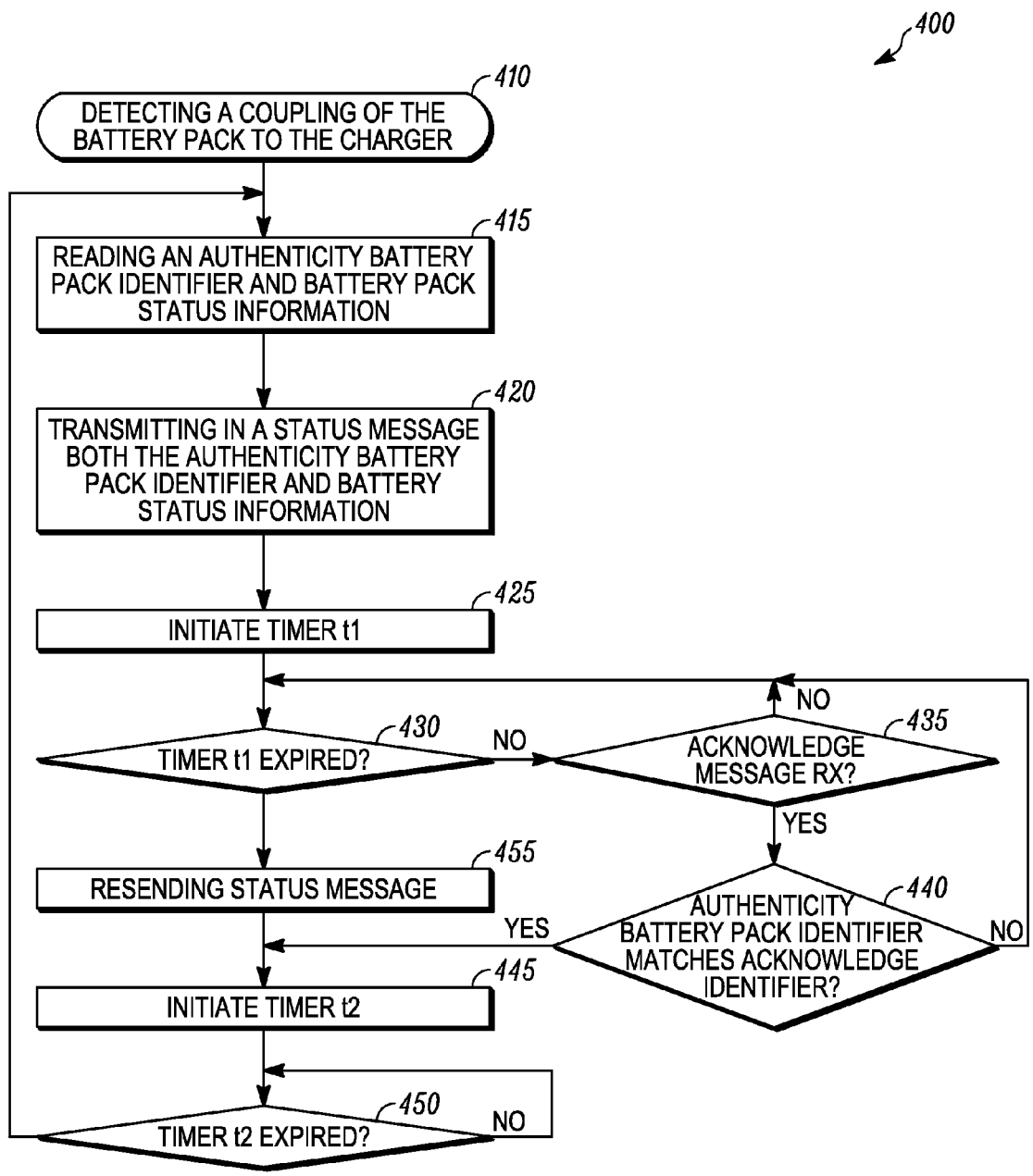
FIG. 4 is a flow diagram illustrating a second embodiment of a method for communicating battery pack charging status information from the charger to the radio that forms part of the system of FIG. 1.

Referring to FIG. 4 there is a flow diagram illustrating a second embodiment of a method 400 for communicating battery pack charging status information from the charger 180 to the radio 110 using two way communication across the wireless link 199 when the charger 180 and the radio 110 are both coupled to the battery pack 140. The method 400 is performed by the charger 180 and invoked at a detecting block 410 by detecting a coupling of the battery pack 140 to the charger 180. The detecting is achieved by the pull up resistor R3 pulling up the coupling detection input CDI to Batt+ when the battery pack 140 is coupled to the charger 180. Also, when the battery pack 140 is coupled to the charger 180, there is a short delay (due to the delay circuit 170) before the pull up resistor R3 biases the Field Effect Transistor TR3 to conduct. As a result, after the short delay, the common node G is pulled low to Batt− such that the Field Effect Transistor T2 is non conducting thereby disallowing communication between the battery monitor circuit 160 and radio circuit 112 through the parameter status output contact 148 and the battery parameter status input contact 118.

At a reading block 415, the charger 180 reads an authenticity battery pack identifier, battery type information (that may comprise part of the authenticity battery pack identifier) and battery pack status information that is provided by the battery monitor circuit 160 and EPROM 162 circuitry to the controller 188 at the charge status input CSI. Also, if the battery type information identifies that the battery pack 140 is of a type that can be charged by the charger 180 (valid battery pack) and the battery pack status information indicates that the battery cells 141 are not fully charged then the controller 188 controls the charging circuit 182 to supply a suitable voltage and charging current to the battery cells 141.

At a transmitting block 420 the charger 180 transmits in a status message both the authenticity battery pack identifier and charging status information from the charger 180 to the radio 110 over the wireless link 199. At a block 425, a TIMER t1 is then initiated and at a test block 430 a test is performed to determine if the TIMER t1 has expired. If at the test block 430 it is determined that the TIMER t1 has not expired then a test block 435 determines if an acknowledge message has been received by the charger wireless communications circuit 185 across the wireless link 199. This acknowledge message comprises an authenticity battery pack identifier assumed to have been transmitted from a radio such as the radio 110. If no such acknowledge message has been received then the method 400 returns to test block 430, however, if an acknowledge message has been received then a matching test is performed at a test block 440 to determine if the authenticity battery pack identifier received in the acknowledge message matches the currently coupled battery pack identifier of the battery pack coupled to the charger 180. If there is no match the method 400 returns to test block 430, however, if there is a match at test block 440 a TIMER t2 is initiated, at a block 445, and at a test block 450 a test is repeated until the TIMER t2 expires. When the TIMER t2 expires the method 400 then returns to the reading block 415. As will be apparent to a person skilled in the art, the method 400 can terminate at any time if the charger 180 is un-coupled from the battery pack 140 or if the power to the charger 180 is switched off. In addition, the battery monitor circuit 160 updates the charging status information by monitoring the current flowing through resistor R1 and this updated charging status information is read by the charger 180 every time the reading block 415 is performed.

Returning to test block 430, if the TIMER t1 expires then a resending block 455 resends the status message across the wireless link 199 and then the method proceeds to block 445, where the TIMER t2 is initiated. Thus, the charger detects the acknowledge message at block 435 and the resending block 455 sends the status message when the authenticity battery pack identifier does not match the acknowledge identifier. In this regard, the acknowledge identifier can be the authenticity battery pack identifier or the currently coupled battery pack identifier.

Figure 5:
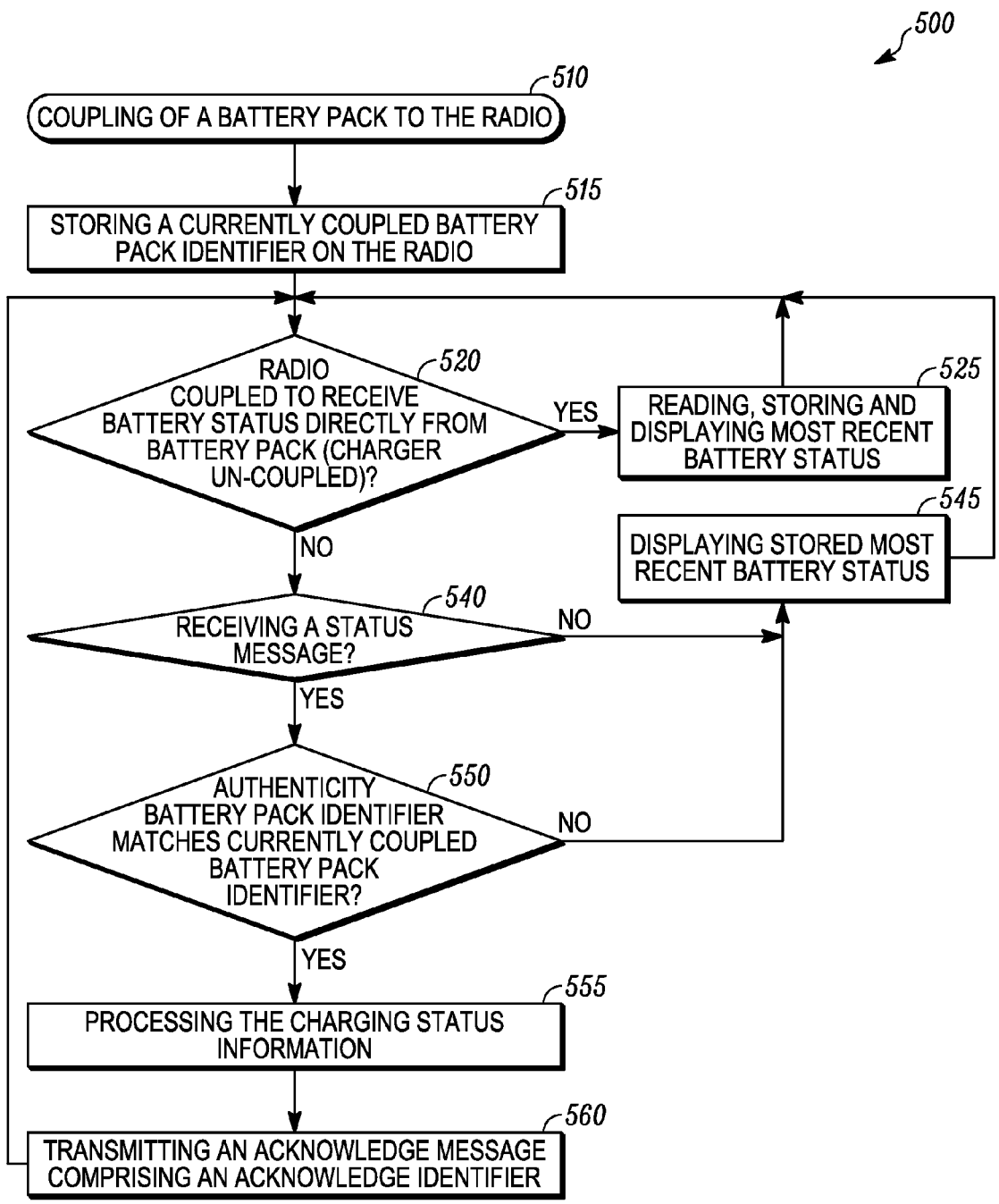
FIG. 5 is a flow diagram further illustrating the second embodiment of a method for communicating battery pack charging status information from the charger to the radio that forms part of the system of FIG. 1.

Referring to FIG. 5 there is a flow diagram further illustrating the second embodiment of a method 500 for communicating battery pack charging status information from the charger 180 to the radio 110 using two way communication across the wireless link 199. The method 500 is performed by the radio 110 and is invoked at a coupling block 310 when the battery pack 140 is coupled to the radio 110 thereby providing power to the radio 110. Next, at a storing block 515 the radio 110 stores a currently coupled battery pack identifier in the radio 110 (in a memory of the radio circuit 112), the currently coupled battery pack identifier being provided by the battery pack 140 to the radio 110 before the charger 180 is coupled to the battery pack 140. Hence, the currently coupled battery pack identifier is stored in the radio 110 when the radio 110 initially detects a coupling of the battery pack 140 to the radio 110 before the charger 180 is coupled to the battery pack 140. More specifically, when the charger 180 is un-coupled from the battery pack 140 the Field Effect Transistors T1, T2 allow communication between the battery monitor circuit 160 and radio circuit 112 through the parameter status output contact 148 and the battery parameter status input contact 118. This allows for the currently coupled battery pack identifier to be stored and the battery status information (such as remaining battery cell charge), provided by the battery monitor circuit 160 to be processed and displayed by an electronic display of the radio circuit 112.

At a test block 520, a test is performed to determine if the radio 110 is coupled to receive battery status information directly from the battery pack 140, at this test block 520 the radio 110 attempts to communicate with the battery monitor circuit 160 and can only communicate if the charger 180 is un-coupled from the battery pack 140. If the charger 180 is un-coupled from the battery pack 140 then at a block 525 the radio 110 reads, stores, and displays the most recent battery status information on the electronic display of the radio circuit 112. After block 525 the test block 520 is repeated.

If the charger 180 is coupled to the battery pack 140 then after test block 520 a test block 540 determines if the message has been received (typically by an interrupt process) by the radio secondary communications circuit 120 across the wireless link 199. If a message has not been received then at a block 545 the stored most recent battery status information is displayed on the electronic display of the radio circuit 112, the most recent battery status information being previously stored during performance of block 535. After block 545 the test block 320 is repeated.

If at test block 540 it is determined that a message has been received then a matching test is performed at a test block 550 to determine if the authenticity battery pack identifier matches the currently coupled battery pack identifier. If there is no match at test block 550 then the stored most recent battery status information is displayed on the electronic display of the radio circuit 112 at block 545. However, if there is a match at test block 550 then the radio 110 processes the charging status information at a processing block 555. Hence, this processing, by the radio, 100 of the charging status information occurs when the authenticity battery pack identifier matches the currently coupled battery pack identifier. The processing includes displaying the charging status information (the battery status) on the information on the electronic display of the radio circuit 112. Next a transmitting block 560 transmits an acknowledge identifier in an acknowledge message over the wireless link 199. The acknowledge identifier typically comprises either the currently coupled battery pack identifier or the authenticity battery pack identifier (as they contain the same unique identification data).

The method 500 then returns to block 520. This charging status information (the battery status) is then stored as the most recent battery status in memory of the radio circuit 112. As will be apparent to a person skilled in the art, the method 300 can terminate at any time if the radio 110 is un-coupled from the battery pack 140 or if the radio 110 switched off.

Advantageously, the present invention provides for the limited number of contacts on the battery pack 140 being sufficient to allow the charger 180 to communicate the charging status information to the radio 110 over the wireless link 199 in the status message. To avoid cross talk or reception of incorrect messages from another system, the radio 110 only completely processes (including displaying) charging status information received in a status message having a valid authenticity battery pack identifier that matches the currently coupled battery pack identifier.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims.

We claim:

1. A method for communicating battery pack charging status information of a battery pack from a battery charger to an electronic device when the battery charger and the electronic device are both coupled to the battery pack, the method comprising:
   reading an authenticity battery pack identifier and charging status information provided by the battery pack to the battery charger, the battery charger and the electronic device being separate devices that are each able to be individually decoupled from the battery pack;
   transmitting in a status message over a wireless link the authenticity battery pack identifier and charging status information from the battery charger to the electronic device; and
   processing, by the electronic device, the charging status information when the authenticity battery pack identifier matches a currently coupled battery pack identifier stored in the electronic device, the currently coupled battery pack identifier identifying the battery pack that is coupled to the electronic device.

2. A method as claimed in claim 1, wherein the currently coupled battery pack identifier is stored in the electronic device when the electronic device initially detects a coupling of the battery pack to the electronic device.

3. A method as claimed in claim 1, wherein the processing includes displaying the charging status information on the information on an electronic display of the electronic device.

4. A method as claimed in claim 1, wherein the charging status information includes data indicative of the amount of charge remaining in the battery pack.

5. A method as claimed in claim 1, further comprising transmitting in an acknowledge message over the wireless link an authenticity battery pack identifier stored in the electronic device from the electronic device to the battery charger, the acknowledge message to acknowledge receipt of the status message by the electronic device.

6. A method as claimed in claim 5, further comprising the charger:
   detecting the acknowledge message;
   determining whether the authenticity battery pack identifier received in the acknowledge message matches the authenticity battery pack identifier transmitted to the electronic device; and
   resending the status message when the authenticity battery pack identifier received in the acknowledge message does not match the authenticity battery pack identifier transmitted to the electronic device.

7. A method as claimed in claim 6, wherein the acknowledge identifier comprises the authenticity battery pack identifier.

8. A method as claimed in claim 6, wherein the acknowledge identifier comprises the currently coupled battery pack identifier.

9. A method as claimed in claim 1, wherein the transmitting is performed by a radio transponder that is powered by the charger through inductive coupling and comprises an RFID antenna and a modulator/demodulator capable of receiving and transmitting data by means of inductive coupling.

10. A method for communicating battery pack charging status information of a battery pack from a battery charger to an electronic device when the battery charger and the electronic device are both coupled to the battery pack, the method comprising:
    reading an authenticity battery pack identifier and battery pack charging status information provided by the battery pack to the battery charger; and
    transmitting in a status message over a wireless link the authenticity battery pack identifier and battery pack charging status information from the battery charger to the electronic device.

11. A method as claimed in claim 10, wherein the battery pack charging status information includes data indicative of an amount of charge remaining in the battery pack.

12. A method as claimed in claim 11, further comprising the charger:
    detecting an acknowledge message comprising an acknowledge identifier, the acknowledge message transmitted by the electronic device to the charger to acknowledge receipt of the status message by the electronic device;
    determining whether the authenticity battery pack identifier received in the acknowledge message matches the authenticity battery pack identifier transmitted to the electronic device; and
    resending the status message when the authenticity battery pack identifier received in the acknowledge message does not match the authenticity battery pack identifier transmitted to the electronic device.

13. A method as claimed in claim 12, wherein the acknowledge identifier comprises the authenticity battery pack identifier.

14. A battery charger comprising:
    a controller having a charge status input;
    a wireless communications circuit coupled to the controller; and
    a battery charging circuit having at least one control input coupled to the controller,
    wherein when the battery charger is coupled to the battery pack the controller reads an authenticity battery pack identifier provided by the battery pack at the charge status input and the wireless communications circuit transmits the battery pack identifier over a wireless link.

15. A method as claimed in claim 1, further comprising limiting wireless communication over the wireless link between the battery charger and the electronic device to only one way communication from battery charger to the electronic device.

16. A method as claimed in claim 1, further comprising limiting the manner in which the authenticity battery pack identifier and charging status information are able to be transmitted to the electronic device when the battery charger and the electronic device are both coupled to the battery pack such that the authenticity battery pack identifier and charging status information are only able to be transmitted over the wireless link.

17. A method as claimed in claim 1, wherein the authenticity battery pack identifier uniquely identifies the battery pack.

18. A method as claimed in claim 1, wherein the reading, transmitting and processing are continuously repeated until the battery charger is decoupled from the battery pack.

19. A method as claimed in claim 1, further comprising:
   disabling wired communication between the battery pack and the electronic device such that the authenticity battery pack identifier and charging status information is provided to the electronic device only through wireless communication from the battery charger when the battery charger and the electronic device are both coupled to the battery pack; and
   enabling wired communication between the battery pack and the electronic device such that the charging status information is provided to the electronic device only through wired communication from the battery pack when the battery charger is decoupled from the battery pack.

* * * * *

UNITED STATES PATENT AND TRADEMARK OFFICE
CERTIFICATE OF CORRECTION

PATENT NO. : 7,808,205 B2
APPLICATION NO. : 11/754632
DATED : October 5, 2010
INVENTOR(S) : Rao et al.

It is certified that error appears in the above-identified patent and that said Letters Patent is hereby corrected as shown below:

In Column 4, Lines 24-30, delete "A pull up resister R3 couples ........... circuit 120." and insert -- The charger 180 typically has a charging circuit 182, such as a transformer, rectifier, voltage regulation and smoothing circuitry, with Batt+ and Batt- power lines coupled by respective charging power line contacts 184, 186 to the charging power line contacts 154, 156. The charger 180 also has a battery parameter status input contact 198 coupled to the battery parameter status output contact 149 and a battery coupling detector input contact 192 that is coupled to the charger coupling detector input contact 172. The charger 180 has a controller 188 and a charger wireless communications circuit 185, with an antenna 187, the charger wireless communications circuit 185 being coupled to the controller 188. Furthermore, the controller 188 has a charge status input CSI coupled to the battery parameter status input contact 198 and a coupling detection input CDI coupled to the battery coupling detector input contact 192. A control output CO of the controller 188 is coupled to a control input CI of the charging circuit 182 to control the charging rate and charging voltage provided by the charging circuit 182 to the battery pack 140. The charging rate and charging voltage are determined by the stored charge instructions and other recharge related data, such as rated capacity and chemistry that are stored in the EPROM 162. --, therefor.

In Column 7, Line 6, after "information" delete "that is".

In Column 7, Line 52, delete "sends" and insert -- resends --, therefor.

Signed and Sealed this
Seventh Day of August, 2012

David J. Kappos
*Director of the United States Patent and Trademark Office*